(12) United States Patent
Manku et al.

(10) Patent No.: US 8,743,746 B2
(45) Date of Patent: Jun. 3, 2014

(54) TRANSCEIVER FILTER AND TUNING

(75) Inventors: Tajinder Manku, Waterloo (CA); Zohaib Moti, Kitchener (CA)

(73) Assignee: BlackBerry Limited (CA)

( * ) Notice: Subject to any disclaimer, the term of this patent is extended or adjusted under 35 U.S.C. 154(b) by 39 days.

(21) Appl. No.: 13/557,507

(22) Filed: Jul. 25, 2012

(65) Prior Publication Data
US 2014/0029480 A1 Jan. 30, 2014

(51) Int. Cl.
*H04B 7/005* (2006.01)

(52) U.S. Cl.
USPC .......................... 370/278; 370/328; 370/276

(58) Field of Classification Search
USPC .......................................................... 455/73
See application file for complete search history.

(56) References Cited

U.S. PATENT DOCUMENTS

| | | | |
|---|---|---|---|
| 5,638,034 A | 6/1997 | Heikkila et al. | |
| 5,757,247 A | 5/1998 | Koukkari et al. | |
| 7,145,415 B2 | 12/2006 | Sengupta et al. | |
| 7,729,621 B2 | 6/2010 | Nahapetian et al. | |
| 7,957,702 B2 * | 6/2011 | Haartsen et al. | 455/78 |
| 8,130,053 B2 | 3/2012 | Mu | |
| 8,145,141 B2 * | 3/2012 | Toncich et al. | 455/77 |
| 2005/0040909 A1 | 2/2005 | Waight et al. | |
| 2007/0024393 A1 | 2/2007 | Forse et al. | |
| 2007/0047681 A1 | 3/2007 | Chan et al. | |
| 2009/0054008 A1 | 2/2009 | Satou | |
| 2011/0001573 A1 | 1/2011 | Carmel et al. | |
| 2011/0241797 A1 | 10/2011 | Shana'a et al. | |

OTHER PUBLICATIONS

Zhang et al., "A process research for integrated RF tuneable filter", Proceedings of the 1st IEEE International Conference on Nano/Micro Engineered and Molecular Systems, Jan. 18-21, 2006, Zhuhai, China, pp. 1449-1452.
Hashimoto, Ken-Ya; Tanaka, S.; Esashi, M., "Tunable RF SAW/BAW filters: Dream or reality?," Frequency Control and the European Frequency and Time Forum (FCS), 2011 Joint Conference of the IEEE International , vol., No., pp. 1,8, May 2-5, 2011.
Extended European Search Report, EP 12177875.7, EPO, Jan. 3, 2013.
Moon, J. et al., "A multimode/multiband envelope tracking transmitter with broadband saturated amplifier", IEEE Transactions on microwave theory and techniques, vol. 59, No. 12, Dec. 2011.
Freescale, "GaAs MMICs for Femtocell", May 2012, http://cache.freescale.com/files/rf_if/doc/support_info/RFFEMTOCELL_TRN_SI.pdf.

* cited by examiner

*Primary Examiner* — Duc C Ho

(57) ABSTRACT

A radio transceiver including a transmitter and a receiver. A filter coupled to an output of the transmitter, the filter has one or more inductors and one or more capacitors, where the filter is tuned by varying one or more capacitance values of the one or more capacitors in the filter to tune the filter. The one or more capacitors are Barium Strontium Titanate (BST) ceramic integrated capacitors that are each tuned by application of a bias voltage thereto. A filter tuner circuit is configured to apply the bias voltage to the one or more capacitors, where the bias voltage is initially established as a stored initial value, and where the bias voltage is refined by a proportional-integral-derivative (PID) controller configured to optimize a power within the transceiver. This abstract is not to be considered limiting since various implementations may incorporate more, fewer or different elements.

14 Claims, 4 Drawing Sheets

US 8,743,746 B2

TRANSCEIVER FILTER AND TUNING

BACKGROUND

In modern radios such as those used in cellular telephones, a high performance receiver path is used to detect signals below −110 dBm in the presence of blocking signals up to −20 dBm. This makes design of the radio and the frequency synthesizer challenging in terms of reducing power consumption. The receiver (Rx) path may also be used to sense the transmitter (Tx) signal for either envelope tracking or tuning the antenna. Furthermore, the receiver may be used to detect blockers or jamming signals to improve the quality of the wanted signal. This introduces practical implementation problems such as VCO (voltage control oscillator) pulling in the receiver.

In radio designs using full duplex (simultaneous Rx and Tx) modes of operation, such as those used in certain code division multiple access (CDMA) cellular telephone and next generation technologies, transmitted signals entering the receiver input can be an especially significant problem. In these technologies, an auxiliary Rx channel is sometimes used for power level sensing and balancing of both receiver and transmitter. These additional channels are known, and commercial ICs for implementing such auxiliary channels exist.

Consider the design of a conventional full duplex radio transceiver such as that depicted in FIG. 1. In such a design, a transmitter 100 output signal is passed to an antenna 104 through a switch 108. Since modern receiver designs may operate over multiple bands, multiple transmitters and receivers may be represented by transmitter 100 and receiver 112. Since the transmitter and receiver share the same antenna, for each band of frequencies used by the receiver, the design shown in FIG. 1 utilizes a separate filter 116, 120 through 124 (e.g., a SAW filter or the like) configured as notch filters. Switch 108 switches to the correct notch filter for the band of transmitted signals based on commands from a control processor 130 based on a selected channel or band. These notch filters are used to prevent the relatively high power from the RF amplifier 134 of transmitter 100 from entering the front end low noise amplifier of the receiver 112 and either damaging the receiver or degrading operation thereof.

As worldwide radio receivers are developed, as many as 20 (or possibly more) bands of frequencies may need to be accommodated to truly handle each possible frequency band.

BRIEF DESCRIPTION OF THE DRAWINGS

Example embodiments of the present disclosure will be described below with reference to the included drawings such that like reference numerals refer to like elements and in which.

DETAILED DESCRIPTION

Figure 1:
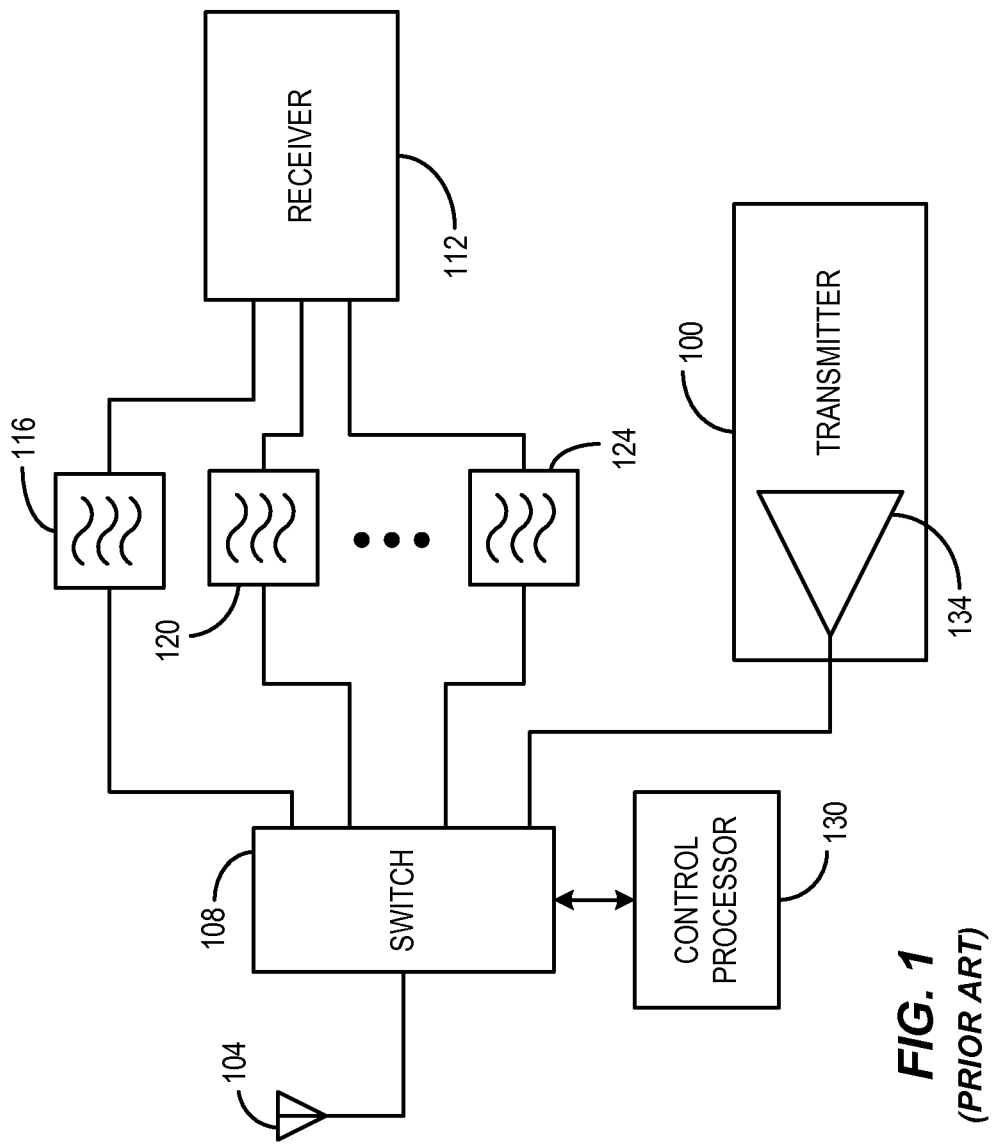
FIG. 1 is block diagram of an example full duplex radio design for multiple frequency bands.

The various examples presented herein outline methods, user interfaces, and electronic devices that allow a multiple band radio to operate without use of large numbers of individual filters for each of a plurality of radio bands.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an application or "app", an object method, an object implementation, in an executable application, an applet, a servlet, a source code, an object code, a script, a program module, a shared library/dynamic load library and/or other sequence of instructions designed for execution on a computer system.

Therefore, in accordance with certain aspects of the present disclosure, there is provided a radio transceiver having a transmitter and a receiver. A filter is coupled to an output of the transmitter, the filter having one or more integrated capacitors, where the filter is tuned by varying one or more capacitance values of the one or more integrated capacitors in the filter to tune the filter, at least one of the one or more integrated capacitors comprise Barium Strontium Titanate (BST) ceramic integrated capacitors that are each tuneable by application of a bias voltage thereto. A filter tuner circuit is configured to apply the bias voltage to the one or more integrated capacitors, where the bias voltage is initially established as a stored initial value. A proportional-integral-derivative (PID) controller is configured to refine the bias voltage to optimize a power within the transceiver.

In certain implementations, the filter is a notch filter coupled between a transmitter output and a receiver input of the transceiver that blocks transmitter power from entering the receiver. In certain implementations, the PID controller is configured to maximize a difference between receiver frequency power and transmitter frequency power at the receiver input. In certain implementations, the filter tuner circuit has a low pass filter configured to receive transmitter signals present at the receiver input, a power calculator configured to calculate power received from the low pass filter, and an error calculator configured to calculate a difference between the calculated power and receive frequency power present at the receiver input, where the PID controller is configured to maximize a difference between the receiver frequency power and transmitter frequency power at the receiver input. In certain implementations, the PID controller is configured to maximize a difference between receiver frequency power and transmitter frequency power at the receiver input. In certain implementations, the filter is a notch filter.

In certain implementations, the transmitter and receiver described above represent a plurality of transmitters and receivers operable over three bands, where the three bands comprise a low band between 700 Mhz and 1 Ghz, a middle band between 1.8 Ghz and 2.2 Ghz and a high band between 2.3 Ghz and 2.7 Ghz. In certain implementations, the filter described above represents three filters, one for each of the three bands, and where each of the three filters are coupled directly to one of three receivers. In certain implementations, the one or more integrated capacitors are exposed to transmitter power in excess of 20 dBm.

A radio transceiver consistent with certain implementations has a multi-band transmitter and a multi-band receiver, where the transmitter and receiver are configured to operate in full duplex with a transmitter channel for use by the transmitter and a receiver channel for use by the receiver. An antenna is shared by the transmitter and the receiver for full duplex communication, where the transmitter has an output coupled to the receiver and the receiver has an input coupled to the antenna. A notch filter made up of one or more integrated capacitors is disposed between the antenna and the receiver. The notch filter is configured to be tuned by varying one or more capacitance values of the one or more integrated capacitors in the notch filter to select the transmitter channel for rejection by the notch filter, at least one of the one or more integrated capacitors comprising Barium Strontium Titanate (BST) ceramic integrated capacitors that are each tuneable by application of a bias voltage thereto. A filter tuner circuit is configured to apply the bias voltage to the one or more integrated capacitors, where the bias voltage is initially established as a stored initial value, and where the bias voltage is refined by a proportional-integral-derivative (PID) controller configured to optimize a power in the transceiver.

In certain implementations, the PID controller is configured to maximize a difference between receiver frequency power and transmitter frequency power at the receiver input. In certain implementations, the filter tuner circuit is a low pass filter configured to receive transmitter signals present at the receiver input with a power calculator configured to calculate power received from the low pass filter, and an error calculator configured to calculate a difference between the calculated power and receive frequency power present at the receiver input, where the PID controller is configured to maximize a difference between receiver frequency power and transmitter frequency power at the receiver input.

In certain implementations, the multi-band transmitter and multi-band receiver described above represents a plurality of transmitters and receivers operable over three bands, where the three bands comprise a low band between 700 Mhz and 1 Ghz, a middle band between 1.8 Ghz and 2.2 Ghz and a high band between 2.3 Ghz and 2.7 Ghz. Similarly, the filter described above represents three filters, one for each of the three bands, and where each of the three filters are coupled directly to one of three receivers. In certain implementations, the one or more integrated capacitors are exposed to transmitter power in excess of 20 dBm.

An example method of tuning a filter in a radio transceiver, involves providing a tuneable filter forming a part of the transceiver having an integrated capacitor, where the integrated capacitor comprises as Barium Strontium Titanate (BST) ceramic integrated capacitor that is tuneable by application of a bias voltage thereto, where the transceiver has a transmitter and a receiver; retrieving a stored initial value of the bias voltage from a memory; and refining the initial value of the bias voltage by using a proportional-integral-derivative (PID) controller to produce a refined bias voltage and applying the refined value bias voltage to the capacitor to optimize a signal in the radio transceiver.

In certain implementations, the method further involves applying the initial value of the bias voltage to the capacitor prior to refining the initial value. In certain implementations, the refining comprises maximizing a difference between a power transmitted by the transmitter and a power from the transmitter appearing at the input of the receiver. In certain implementations, the filter comprises a notch filter coupled between a transmitter output and a receiver input of the transceiver that blocks transmitter power from entering the receiver. In certain implementations, the refining comprises maximizing a difference between receiver frequency power and transmitter frequency power at the receiver input. In certain implementations, the transmitter and receiver comprise a plurality of transmitters and receivers operable over three bands, where the three bands comprise a low band between 700 Mhz and 1 Ghz, a middle band between 1.8 Ghz and 2.2 Ghz and a high band between 2.3 Ghz and 2.7 Ghz. In certain implementations, the filter discussed above represents three filters, one for each of the three bands, and where each of the three filters are coupled directly to one of three receivers. In certain implementations, the integrated capacitor is exposed to transmitter power in excess of 20 dBm.

As noted above, as many as 20 bands of channels are to be accommodated in order to provide a single radio that operates worldwide. Unfortunately, the mechanism used in FIG. 1 for isolating the sensitive input of the receiver from high powers from the transmitter would result in use of a complex switch circuit 108 and perhaps twenty or more notch filters 116, 120 through 124. Such filters while having a relatively small footprint individually, will occupy a considerable amount of space when twenty such filters are used. Moreover, the cost of twenty filters increases the cost of the radio and constrains the how small the radio can be.

An improvement can be made by utilizing tuneable capacitors to implement traditional inductor and capacitor filter structures. But simply substituting LC filter designs that utilize conventional variable integrated capacitors may be detrimental to the life of the radio and may not conserve valuable real estate. Conventional metal-insulator-metal (MIM) and metal-oxide-metal (MOM) integrated capacitors may fail or degrade if exposed to high voltage and power. For example, such capacitors are generally limited to voltages of 3.0 volts maximum to achieve long term reliable performance. This corresponds to a maximum power of about 13-14 dBm. But, 3G and 4G LTE cellular radio transmitters can output between about 8 and 20 volts to provide output power in excess of 20 dBm and generally between about 22 and 33 dBm. The filters may be exposed to such powers in use for up to 5-10 years. Using conventional MIM and MOM integrated capacitors to implement such filters will surely result in premature failure or performance degradation, and likely catastrophic failure of the radio.

In order to achieve a reasonable substitution of variable LC filters in an integrated radio system, conventional capacitors such as MIM capacitors or MOM capacitors are clearly unsuitable. However, it has been found that doped Barium Strontium Titanate (BST) integrated ceramic capacitors such as those manufactured by Paratek Microwave, Inc. can reliably handle power in the range of 40 dBm reliably for long periods of time. Additionally, in the present application, twenty bands of filters can be handled with only three variable filters for high, middle and low band frequency ranges. For current frequency allocations, this can be done with a low band between 700 Mhz and 1.0 Ghz, a middle band of 1.86 Ghz to 2.2 Ghz and a high band between 2.3 Ghz and 2.7 Ghz, with each band handling six to seven channels.

In the present case, this means that only three variable integrated variable capacitor based filters can be used to replace twenty fixed filters. Since suitable BST based filters designs occupy approximately the same footprint as a single fixed SAW filter, the size savings within the radio are substantial (3/20=0.15 for approximately an 85% savings). Additionally, since a separate receiver is used for each of the three bands (high, low and middle) the switch can be eliminated by simply attaching the variable filter to the front end of each of the three receivers. Thus, each variable filter is paired with a radio receiver of the same band. Any suitable notch filter design, for the present implementation, can be utilized.

An example receiver has the following elements: The receiver is coupled to the output of the transmitter (i.e. near the antenna) via a coupler. This then goes through a tuneable LC (inductive-capacitive) tank that uses BST tuneable integrated capacitors. This is followed by the receiver pre-amp or attenuator, and then a mixer that is attached to a voltage controlled oscillator (VCO) and phase locked loop (PLL). The VCO uses an oscillator that has high frequency protection on the supplies and grounds. After the mixer, filtering and automatic gain control (AGC) follow and then a high band width low current analog to digital converter (ADC) (for example a 100 MHz SAR ADC). The output of ADC are then applied to the various digital signal processing (DSP) blocks for either envelope tracking, antenna tuning, or detecting the contents of the RX spectrum.

Figure 2:
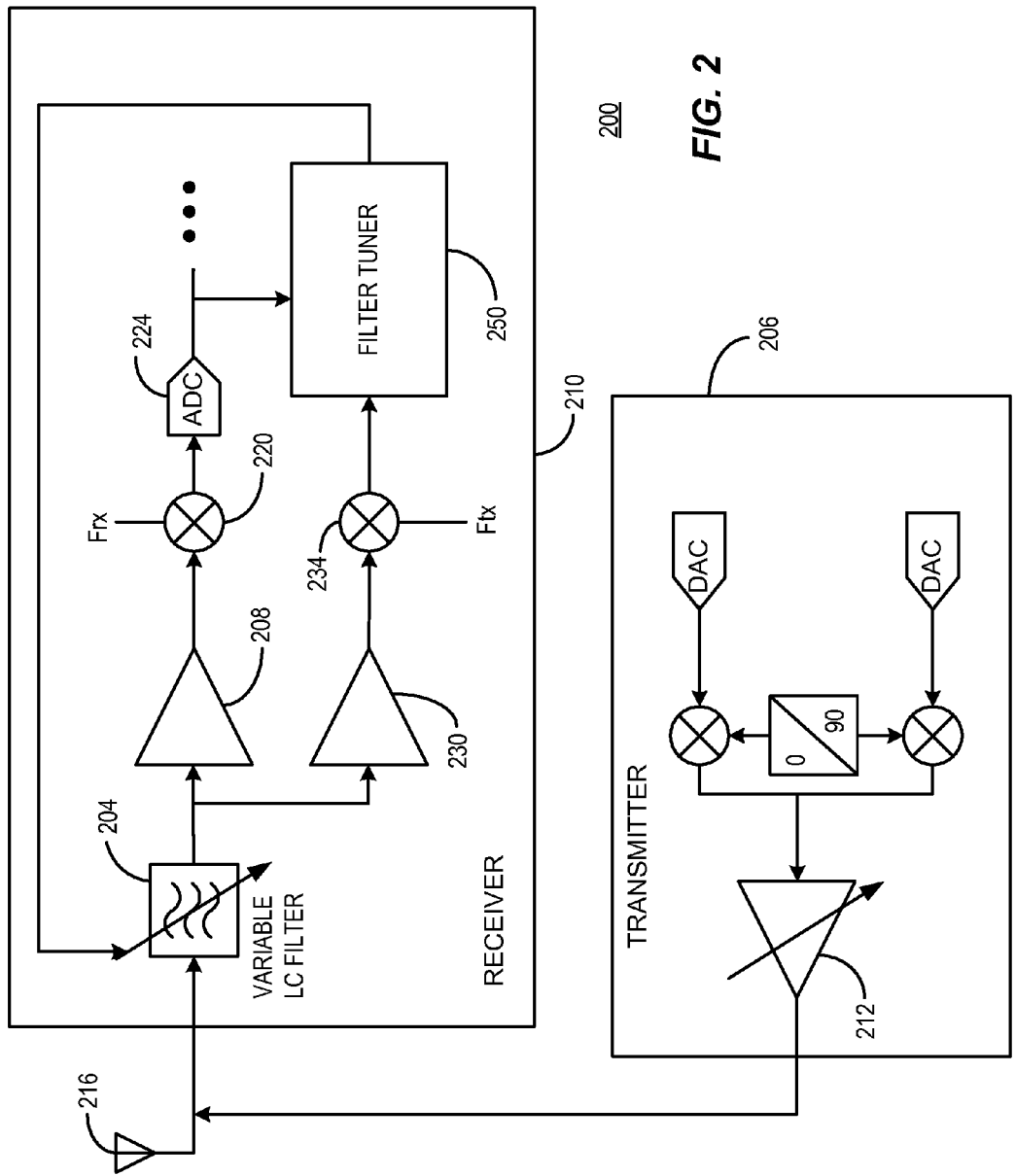
FIG. 2 is an exemplary implementation of a variable filter arrangement consistent with certain embodiments of the present invention.

FIG. 2 is a simplified illustration of an example electronic device 200 in accordance with aspects of the present disclosure. In this example radio, the bank of filters depicted in FIG. 1 is replaced with one or more variable filters 204. These variable notch filters 204 are coupled directly to the input RF amplifier (i.e., the "front end") 208 of the receivers 210 in accord with certain implementations (only one band shown for simplicity and ease of illustration, but it will be understood that multiple filters and receivers are utilized to cover all twenty bands). The variable LC filter 204 is configured as any desired LC notch filter circuit in this application so that power from the transmitter 206's output power amplifier 212 which is intended for antenna 216 is largely blocked from the input of receiver RF amplifier 208. The RF amplifier 208 is coupled to the remainder of the receiver which is shown in part by mixer 220 (which mixes the incoming receiver channel signal with the receiver frequency $F_{RF}$ for direct conversion to baseband) and ADC 224 for operation in a more or less conventional manner which need not be discussed in detail for purposes of this discussion.

The signal at the receiver input is also utilized to control the tuning of the variable integrated capacitor or capacitors used in the LC filter 204 by amplifying the signal using RF amplifier 230 to condition the signal to a suitable level for mixing at mixer 234 with the receiver frequency using a local oscillator at the transmitter frequency $F_{TX}$. Hence, signals at the receive frequency and the transmit frequency are available for measurement and calculation of adjustments for the filter 204 using the filter tuner 250.

In order to implement a suitable filter controller 250, the filter controller is designed and configured so that the adjusted frequency of the filter is manipulated such that the transmit signal is effectively notched out. In this example implementation, a proportional-integral-derivative (PID) controller is chosen to do this. Since the carrier frequency of the transmitter is known by virtue of the channel selection mechanism of the radio, this information can be used to initially coarsely tune the capacitor(s) of the LC filter(s) 204. The PID controller can then be used in a feedback loop as shown with the filter tuner 250 feeding back control signals to LC filter 204 to adjust the capacitor values to achieve an optimized tuning. Any suitable optimization technique can be utilized by the PID controller without limitation.

Figure 3:
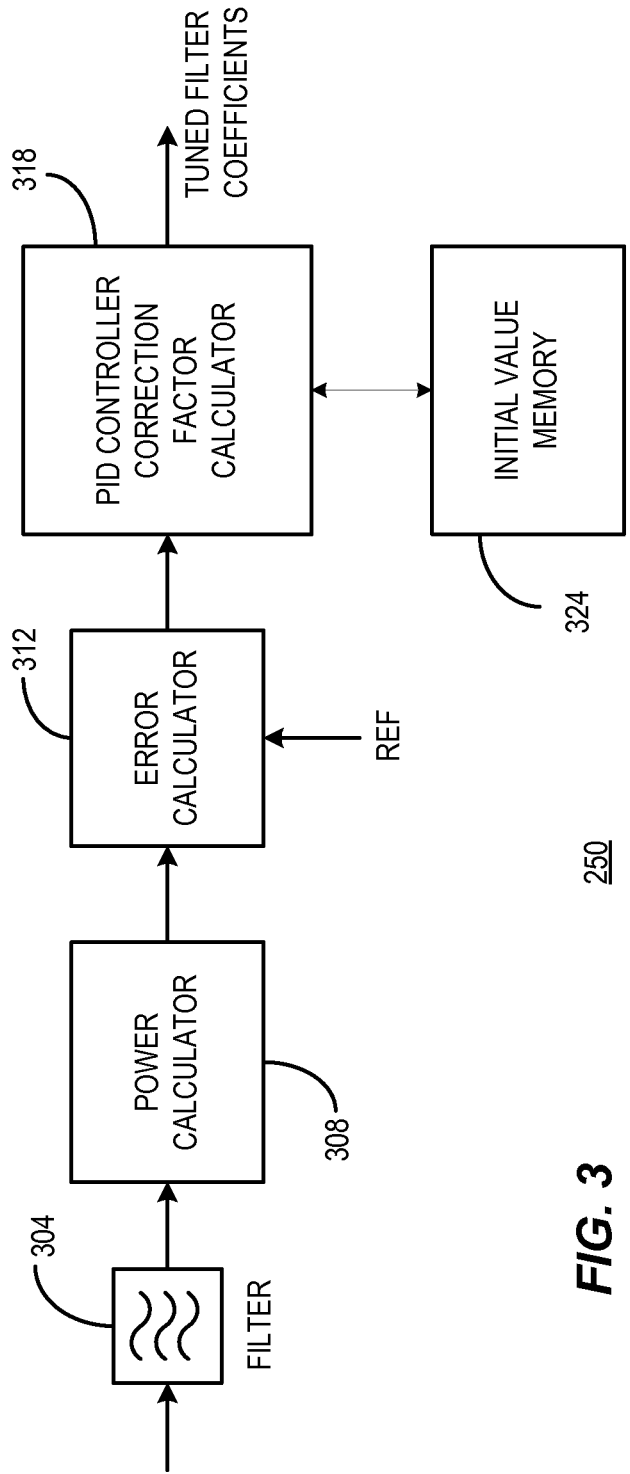
FIG. 3 is an exemplary implementation of a filter tuner circuit consistent with certain embodiments of the present invention.

FIG. 3 is a block diagram of an example functional representation of the filter tuner 250. In accord with this example filter tuner 250, the baseband transmit signal is low pass filtered to eliminate mixing artefacts at filter 304. This filtered baseband transmit signal is passed to a power calculator block 308 that calculates the power in the residual transmit signal present at the input of the receiver. This calculated power is then sent to error calculator 312 that compares this power to a reference value and the output is provided to a PID controller 318 for processing. The initial value or values used to initially set the filter's tuning is stored in memory 324 and that value is initially loaded into the LC filter 204 when the channel is selected. The PID controller modifies this value iteratively to minimize the amount of power from the transmitter that is received at the receiver. In one example implementation, this can be effectively accomplished by maximizing the difference between receiver frequency power $P_{RX}$ and transmit frequency power $P_{TX}$ at the receiver input (i.e., MAX $(P_{RX}-P_{TX})$), where in this example, the reference value provided to the error calculator is the receive frequency power. This maximization process accounts for any effects the notch filter has on the receive frequency power as well as the transmit frequency power.

Figure 4:
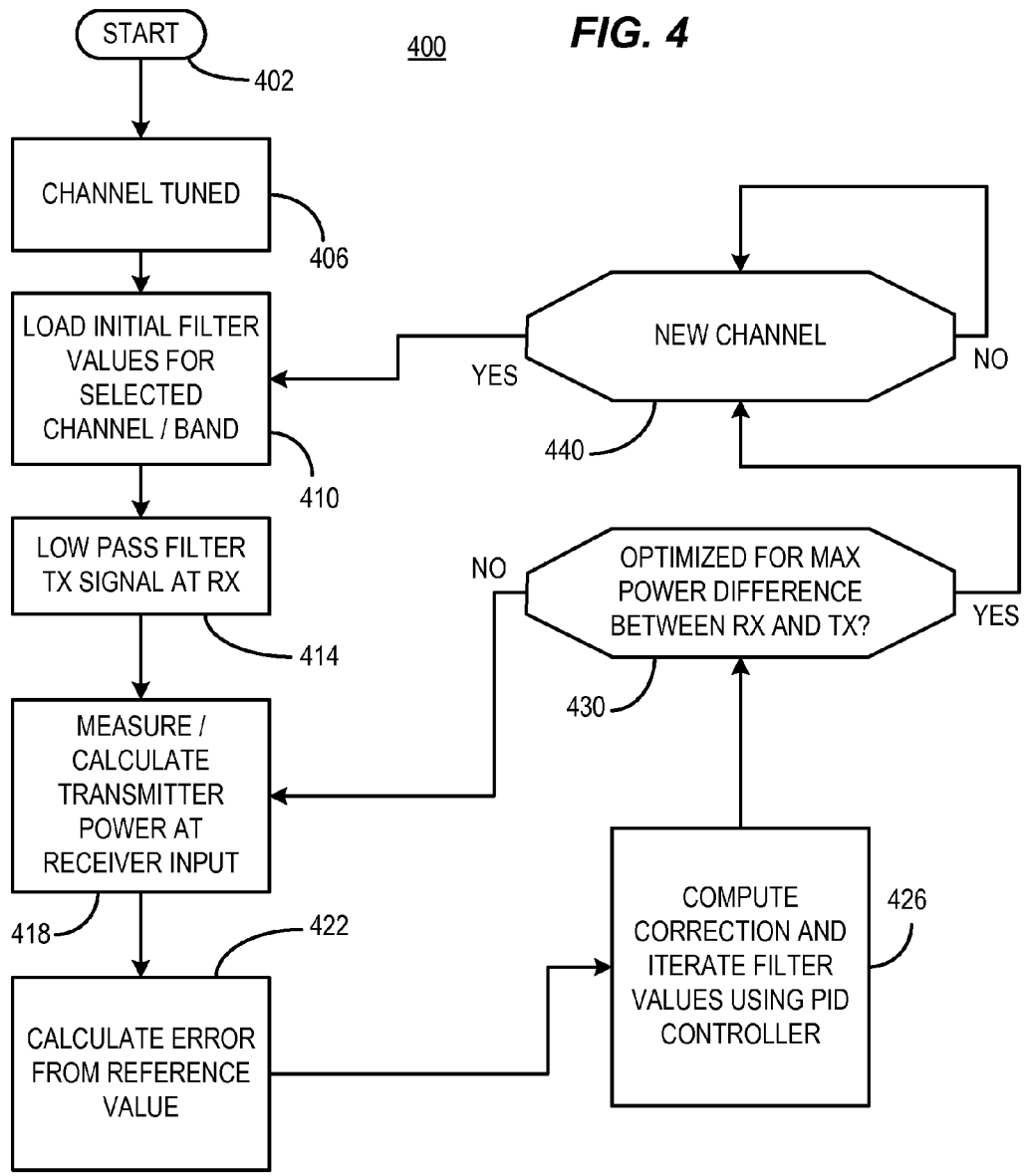
FIG. 4 is an example of a process flow for a filter tuning process consistent with certain embodiments of the present invention.

In the present example implementation, any number of filter tuner implementations can be utilized. FIG. 4 depicts one example implementation process 400 starting at 402. When a channel is tuned at 406, by any suitable mechanism, initial filter values may be loaded into the tuneable LC filter 204 at 410. These initial values may be factory generated as approximate values for a given design, or may be measured and stored for a particular production radio. Even if the initial value is selected for an individual production radio, the RF filter based on inductors and capacitors values will desirably be tuned to optimize the filter characteristics since given components will drift in values with age, changes in temperature, etc. Once the filter has been adjusted according to the present process, the value used most recently may be stored as a new initial value on a channel by channel basis or the original default may be used each time without limitation.

The transmit frequency signal at the receiver input is low pass filtered to remove the unneeded mixing components at 414 and the transmit power at the receiver input is calculated from the signal at 418. The error from the reference values (the receiver power signal) is calculated at 422 and a correction factor is computed at 426 using the PID controller in order to optimize the power difference between the receiver and transmit power at 430. The calculation of a correction factor is iterated in the loop made up of 418, 422, 426 and 430 until the filter value is optimized at 430. Once this correction factor is optimized it may be monitored periodically or simply left in place at 430. This process repeats itself starting at 410 whenever a new channel is selected at 440.

Those skilled in the art will appreciate that this process may be interrupted during the optimizing process should a channel change be effected prior to full optimization, but the basic process can be understood by reference to the process 400 for illustrative purposes. Other variations will occur to those skilled in the art upon consideration of the present teachings. For example, the optimization can be carried out by minimizing the transmit power at the receiver input or by other techniques than those depicted herein without departing from embodiments consistent with the present invention.

The order in which the optional operations represented in the flow chart 400 may occur in any operative order without limitation. Thus, while the blocks comprising the methods are shown as occurring in a particular order, it will be appreciated by those skilled in the art that certain of the blocks may be rearranged and can occur in different orders and be augmented by other process functions than those shown without materially affecting the end results of the methods.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein. For example, while the embodiment discussed above utilizes a notch filter that prevents excessive transmitter power from entering the receiver, other example implementations could use a band pass, low pass or high pass filter configuration where tuning of the filter is accomplished by optimization of a power or power difference (both referred to herein as a power).

It will be appreciated that any module or component disclosed herein that executes instructions may include or otherwise have access to non-transitory and tangible computer readable media such as storage media, computer storage media, or data storage devices (removable or non-removable) such as, for example, magnetic disks, optical disks, or tape data storage. In this document, the term "non-transitory" is only intended to exclude propagating waves and signals and does not exclude volatile memory or memory that can be rewritten or erased. Computer storage media may include volatile and non-volatile, removable and non-removable media implemented in any method or technology for storage of information, such as computer readable instructions, data structures, program modules, or other data. Examples of computer storage media include random access memory (RAM), read only memory ROM, electrically erasable programmable read only memory (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A radio transceiver, comprising: a multi-band transmitter and a multi-band receiver, where the transmitter and receiver are configured to operate in full duplex with a transmitter channel for use by the transmitter and a receiver channel for use by the receiver;
    an antenna shared by the transmitter and the receiver for full duplex communication, where the transmitter has an output coupled to the receiver and the receiver has an input coupled to the antenna;
    a notch filter comprised of one or more integrated capacitors, the notch filter disposed between the antenna and the receiver, where the notch filter is configured to be tuned by varying one or more capacitance values of the one or more integrated capacitors in the notch filter to select the transmitter channel for rejection by the notch filter, at least one of the one or more integrated capacitors comprising Barium Strontium Titanate (BST) ceramic integrated capacitors that are each tuneable by application of a bias voltage thereto; and
    a filter tuner circuit that is configured to apply the bias voltage to the one or more integrated capacitors, where the bias voltage is initially established as a stored initial value, and where the bias voltage is refined by a proportional-integral-derivative (PID) controller configured to optimize a power in the transceiver.

2. The radio transceiver according to claim 1, where the filter tuner circuit comprises:
    a low pass filter configured to receive transmitter signals present at the receiver input;
    a power calculator configured to calculate power received from the low pass filter; and
    an error calculator configured to calculate a difference between the calculated power and receive frequency power present at the receiver input,
    where the PID controller is configured to maximize a difference between receiver frequency power and transmitter frequency power at the receiver input.

3. The radio transceiver according to claim 1, where the multi-band transmitter and multi-band receiver comprise a plurality of transmitters and receivers operable over three bands, where the three bands comprise a low band between 700 Mhz and 1 Ghz, a middle band between 1.8 Ghz and 2.2 Ghz and a high band between 2.3 Ghz and 2.7 Ghz.

4. The radio transceiver according to claim 3, where the notch filter comprises three filters, one for each of the three bands, and where each of the three filters are coupled directly to one of three receivers.

5. The radio transceiver according to claim 1, where the one or more integrated capacitors are exposed to transmitter power in excess of 20 dBm.

6. A radio transceiver, comprising:
    a transmitter;
    a filter coupled to an output of the transmitter, the filter comprised of one or more integrated capacitors, where the filter is tuned by varying one or more capacitance values of the one or more integrated capacitors in the filter to tune the filter, at least one of the one or more integrated capacitors comprise Barium Strontium Titanate (BST) ceramic integrated capacitors that are each tuneable by application of a bias voltage thereto;
    a filter tuner circuit that is configured to apply the bias voltage to the one or more integrated capacitors, where the bias voltage is initially established as a stored initial value;
    a proportional-integral-derivative (PID) controller configured to refine the bias voltage to optimize a power within the transceiver; and
    a receiver, wherein the filter is coupled to an input of the receiver, and wherein the PID controller is configured to maximize a difference between a power transmitted by the transmitter and power from the transmitter appearing at the input of the receiver.

7. The radio transceiver according to claim 6, where the filter comprises a notch filter, coupled between the output of the transmitter and the input of the receiver of the transceiver, that blocks transmitter power from entering the receiver.

8. The radio transceiver according to claim 6, where the filter tuner circuit comprises:

a low pass filter configured to receive transmitter signals present at the receiver input;

a power calculator configured to calculate power received from the low pass filter; and an error calculator configured to calculate a difference between the calculated power and receive frequency power present at the receiver input, where the PID controller is configured to maximize a difference between the receiver frequency power and transmitter frequency power at the receiver input.

9. The radio transceiver according to claim 6, where the transmitter and receiver comprise a plurality of transmitters and receivers operable over three bands, where the three bands comprise a low band between 700 Mhz and 1 Ghz, a middle band between 1.8 Ghz and 2.2 Ghz and a high band between 2.3 Ghz and 2.7 Ghz, and where the filter comprises three filters, one for each of the three bands, and where each of the three filters are coupled directly to one of three receivers.

10. A method of tuning a filter in a radio transceiver, comprising:

providing a tuneable filter forming a part of the transceiver having an integrated capacitor, where the integrated capacitor comprises as Barium Strontium Titanate (BST) ceramic integrated capacitor that is tuneable by application of a bias voltage thereto, where the transceiver has a transmitter and the filter is coupled to an output of the transmitter;

retrieving a stored initial value of the bias voltage from a memory;

applying the initial value of the bias voltage to the capacitor; and refining the initial value of the bias voltage by using a proportional-integral-derivative (PID) controller to produce a refined bias voltage and applying the refined value bias voltage to the capacitor to optimize a signal in the radio transceiver, wherein the refining comprises maximizing a difference between a power transmitted by the transmitter and a power from the transmitter appearing at the input of the receiver.

11. The method according to claim 10, wherein the transceiver further comprises a receiver and wherein the filter is coupled to an input of the receiver.

12. The method according to claim 10, where the filter comprises a notch filter coupled between a transmitter output and a receiver input of the transceiver that blocks transmitter power from entering the receiver.

13. The method according to claim 10, where the transceiver comprises a plurality of transmitters and receivers operable over three bands, where the three bands comprise a low band between 700 Mhz and 1 Ghz, a middle band between 1.8 Ghz and 2.2 Ghz and a high band between 2.3 Ghz and 2.7 Ghz, and where the filter comprises three filters, one for each of the three bands, and where each of the three filters are coupled directly to one of three receivers.

14. The method according to claim 10, where the integrated capacitor is exposed to transmitter power in excess of 20 dBm.

* * * * *

UNITED STATES PATENT AND TRADEMARK OFFICE
CERTIFICATE OF CORRECTION

PATENT NO. : 8,743,746 B2  
APPLICATION NO. : 13/557507  
DATED : June 3, 2014  
INVENTOR(S) : Tajinder Manku and Zohaib Moti Page 1 of 1

It is certified that error appears in the above-identified patent and that said Letters Patent is hereby corrected as shown below:

In the Claims

Claim 1, on column 7, line 57 should read as follows:

-- 1. A radio transceiver, comprising:
   a multi-band transmitter and a multi-band receiver, where the transmitter and receiver are configured to operate in full duplex with a transmitter channel for use by the transmitter and a receiver channel for use by the receiver;
   an antenna shared by the transmitter and the receiver for full duplex communication, where the transmitter has an output coupled to the receiver and the receiver has an input coupled to the antenna;
   a notch filter comprised of one or more integrated capacitors, the notch filter disposed between the antenna and the receiver, where the notch filter is configured to be tuned by varying one or more capacitance values of the one or more integrated capacitors in the notch filter to select the transmitter channel for rejection by the notch filter, at least one of the one or more integrated capacitors comprising Barium Strontium Titanate (BST) ceramic integrated capacitors that are each tuneable by application of a bias voltage thereto; and
   a filter tuner circuit that is configured to apply the bias voltage to the one or more integrated capacitors, where the bias voltage is initially established as a stored initial value, and where the bias voltage is refined by a proportional-integral-derivative (PID) controller configured to optimize a power in the transceiver, and where the PID controller is configured to maximize a difference between receiver frequency power and transmitter frequency power at the receiver input. --.

Signed and Sealed this  
Sixteenth Day of September, 2014

Michelle K. Lee  
*Deputy Director of the United States Patent and Trademark Office*